United States Patent [19]

McVey

[11] 4,382,218

[45] May 3, 1983

[54] SPEED CONTROL FOR FAN MOTOR

[75] Inventor: Charles W. McVey, Chardon, Ohio

[73] Assignee: Stratford Manufacturing, Inc., Chardon, Ohio

[21] Appl. No.: 393,747

[22] Filed: Jun. 30, 1982

[51] Int. Cl.³ ............................................. H02P 7/36
[52] U.S. Cl. ............................... 318/812; 318/345 B; 307/567
[58] Field of Search .................. 318/812, 816, 345 B, 318/345 F, 779, 781, 342; 307/252 B, 255, 555, 567, 540, 296 R; 330/255, 263

[56] References Cited

U.S. PATENT DOCUMENTS 2,981,879 4/1961 Taylor et al. ............... 318/345 F X
3,125,694 3/1964 Palth ................................. 307/555

Primary Examiner—J. V. Truhe
Assistant Examiner—Patrick C. Keane
Attorney, Agent, or Firm—Pearne, Gordon, Sessions, McCoy, Granger & Tilberry

[57] ABSTRACT

A pair of anti-parallel connected NPN transistors function in push-pull manner to regulate alternately current power applied via the transistors to an induction motor driving a fan providing a generally constant motor load. As the transistors apply more or less current to the motor by varying the amount of line voltage applied thereto, the motor speed varies due to more or less pole slippage. The transistors, while reducing the voltage applied to the motor, generally maintain the sine wave characteristics of the applied voltage to preclude high current spikes and other undesirable transients that could result in conventional motor speed circuits utilizing thyristors that are phase-triggered to vary the half-cycle portions of the applied motor voltage.

4 Claims, 3 Drawing Figures

SPEED CONTROL FOR FAN MOTOR

BACKGROUND OF THE INVENTION

The present invention relates in general to electronic speed controls for alternating current motors, and more particularly to a transistor circuit for varying the amount of line voltage applied to a multipole induction motor driving a relatively low rpm ceiling fan of the "Casablanca" type. The induction motor's speed will change due to more or less pole slippage caused by varying the applied power.

It is known in the art that the voltage, and thus the power, applied to an alternating current load can be varied by using adjustable transformers such as Variacs or similar autotransformers. While such transformers may provide suitable power regulation, as passive devices they must necessarily dissipate heat generated in part by unused wattage not applied to the motor. Also, where the load is inductive, reactive current flowing through the transformer adds to the amount of heat that must be dissipated. Further, such transformers are bulky and generally high in cost due to the large amount of copper wire needed to handle relatively high currents.

One solution to the problems noted above lies in the use of well known phase control thyristor circuits that regulate the amount of power applied to an alternating current load by varying the time of voltage application to the load on a half-cycle basis. Such switching circuits, while having known advantages over variable transformers, may cause noise generating current spikes and other undesirable transients, since the sinusoidal wave shape of the applied voltage is abruptly reshaped by the thyristor switching. Where the load is an induction motor, clogging of its armature and movement of its laminations and windings may also occur because of the non-sinusoidal characteristics of the applied voltage.

It is therefore desirable to maintain the sinusoidal characteristics of the applied voltage while reducing or increasing its amplitude as a function of time to reduce or increase the amount of power applied to the motor.

This feature can be provided by using a single transistor for controlling both forward and reverse current pulses applied to the motor, appropriate bridge-configured diodes routing the current pulses through the transistor. Such a single transistor-type motor speed control requires that the transistor dissipate as much as 35 watts of power in the form of waste heat. The temperature of the junction of the transistor can easily reach unacceptable levels, resulting in erratic operation and shortened transistor life.

SUMMARY OF THE INVENTION

In accordance with the present invention, an alternating current power source and a multipole induction motor driving a generally constant load are series-connected with a control circuit for varying the speed of the motor. The control circuit includes a pair of transistors connected in anti-parallel relationship with each other and being series-connected between the source and the motor. Alternating current pulses of like polarity flow through one or the other of the transistors to power the motor, the transistors functioning in push-pull manner, with each transistor carrying approximately one-half of the motor current. Transistor biasing means is adjusted by the motor user to set the conductivity of the transistors at a predetermined level to regulate the amount of power applied by the source to the motor via the transistors. The speed of the motor is determined by the degree of its pole slippage, which is generally proportional to the applied power. Diode means in series with the transistors preclude application of reverse current to the transistors.

Such a control circuit is capable of supplying infintely variable voltage and current to the induction motor while still advantageously maintaining the general sinusoidal characteristics of the applied motor voltage. Further, the control circuit is relatively low in cost and has proven to be highly reliable, since transistor heating caused by the power regulating functions is shared by the two transistors.

BRIEF DESCRIPTION OF THE DRAWING

A fuller understanding of the invention may be had by referring to the following description and claims taken in conjunction with the accompanying drawings, wherein:

DETAILED DESCRIPTION OF THE DRAWING

Figure 1:
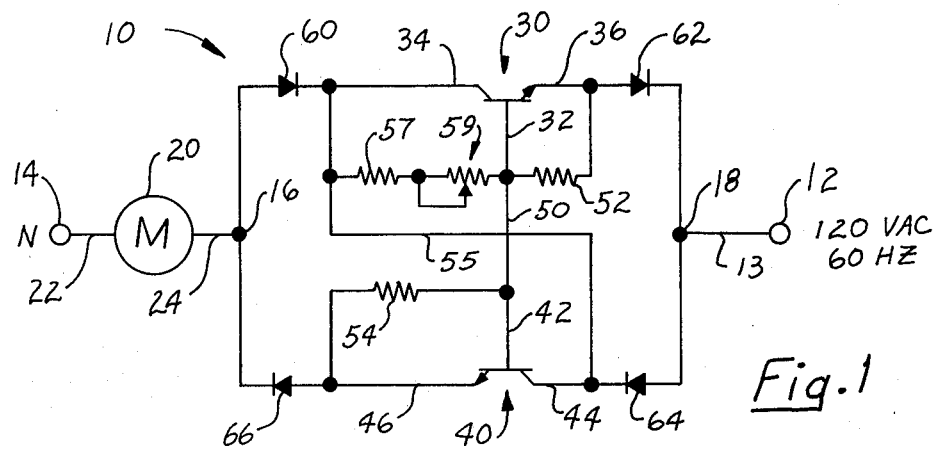
FIG. 1 is a schematic diagram of a control circuit in accordance with the present invention.

FIG. 1 illustrates a control circuit 10 in accordance with the present invention, the control circuit 10 being connected in electrical series relationship with an induction motor 20 and a conventional power source, such as a single-phase commercial line providing 120 volts AC power at 60 hertz. Power is provided by the source at a pair of terminals 12, 14, the terminal 14 being illustrated as a neutral or ground terminal, while the terminal 12 is illustrated as a power input terminal.

A multipole induction motor 20 of, for example, the permanent split capacitor, squirrel cage type drives, for example, a multiblade, "Casablanca style" ceiling fan (not illustrated) providing a generally constant load on the motor 20. A suitable motor is manufactured by Emerson Electric Company, of St. Louis, Mo., and is designated as a Model K55CK29744 having 18 poles and a maximum 200 rpm capability. It is to be emphasized that other multipole motors of the induction type are suitable for application in accordance with the invention, the specific motor noted being for purposes for example only.

The motor 20 includes a pair of power leads 22, 24, the power lead 22 being connected to the neutral terminal 14 of the power source, while the power lead 24 is connected to a first current node 16 of the circuit 10. A second current node 18 is connected via a power lead 13 to power input terminal 12. The motor speed control circuit 10 provided in accordance with the present invention is connected between the current nodes 16 and 18, wherein alternating current provided by the source will flow through the motor 20 via the control circuit 10.

The control circuit 10 includes a first NPN bipolar junction power transistor 30 and a second NPN bipolar junction power transistor 40 connected in anti-parallel relationship with each other between the first and second current nodes 16 and 18.

The first power transistor 30 includes a base electrode 32, a collector electrode 34, and an emitter electrode 36. The collector electrode 34 is connected to the current node 16 via a first diode 60, while the emitter electrode 36 is connected to the second current node 18 via a second diode 62.

In similar fashion, the second power transistor 40 includes a base electrode 42, a collector electrode 44, and an emitter electrode 46. The collector electrode 44 is connected to the second current node 18 via a third diode 64, while the emitter 46 is connected to the first current node 16 via a fourth diode 66.

As is well known in the art, the transistors 30, 40 are unidirectional, current-conducting devices. Thus, it can be seen, in view of the illustrated polarities of the diodes 60, 62, that current will flow from current node 16 via diode 60, through transistor 30 via diode 62, to current-conducting node 18, assuming that transistor 30 is in a conducting condition. Such current flow would be from left to right as illustrated in FIG. 1. In similar fashion, in view of the illustrated polarities of diodes 64, 66, current will flow from current node 18 via diode 64, through transistor 40, then through diode 66 to current node 16, assuming that transistor 40 is in a conducting condition. Such current flow would be from right to left as illustrated in FIG. 1. The transistors 30 and 40, while connected in parallel to each other via their respective reverse current blocking diode pairs 60,62 and 64,66, are thus "anti-parallel" in that they conduct current in a reverse direction relative to each other. Such an arrangement allows the transistors 30, 40 to function in a push-pull manner to provide alternating current pulses to the motor 20 from the source. Thus, like polarity pulses of current flow through one or the other of the transistors, i.e., the transistor 30, will carry one-half of the alternating current pulses to the motor, while the other transistor 40 will carry the other half, assuming that the gains of the transistors are approximately equal. With the transistors 30, 40 in a fully conductive, saturated condition, the voltage drop across such transistors 30,40 and the small forward voltage drop across the respective reverse current blocking diodes 60,62 and 64,66 will be very small, so that essentially all source voltage is applied across the motor since the motor 20, the control circuit 10, and the source are in series-circuit relationship. With full power applied to the motor 20, it will rotate the generally constant mechanical load fan at its maximum rpm, with minimal pole slippage occurring in the motor.

In accordance with the present invention, the amount of voltage dropped across the control circuit 10 is increased by decreasing the conductivity level of the transistors 30,40 via an appropriate biasing network comprised of fixed resistors 52,54,57, and variable resistors 59 in the preferred form of a potentiometer that is user-accessible for adjustment. The transistors 30,40 have their respective base electrodes 32,42 tied together by a common base lead 50. In similar fashion, the collector electrodes 34,44 of the transistors 30,40 are tied together by a common collector lead 55. Resistor 52 is connected across the emitter base junction of transistor 30, while resistor 54 is connected across the emitter base junction of the transistor 40. Connected between the common collector lead 55 and the common base lead 50 are the series-connected resistors 57 and 59, which function to apply more or less base voltage to the transistors to control and bias their conductivity levels. With resistor 59 set at a relatively high value, higher base voltage is applied to the transistors 30,40 to force them into a higher conducting condition wherein full, or nearly full, source or line voltage is applied across the motor, thereby providing maximum current to it. As the resistance of the potentiometer 59 is decreased by the user (by adjusting potentiometer 59), the amount of base drive applied to the transistors 30,40 will be decreased so that the transistors 30,40 will lower their conductivity levels and start to drop voltage, which in turn, in accordance with known electrical theory, decreases the amount of applied voltage to the series-connected motor 20. As the voltage applied to the motor 20 decreases, the motor, because of the relatively constant mechanical load applied by the fan, will begin to slip poles and slow down in speed. Such a phenomenon is well known in the art and need not be discussed in detail.

Figure 2:
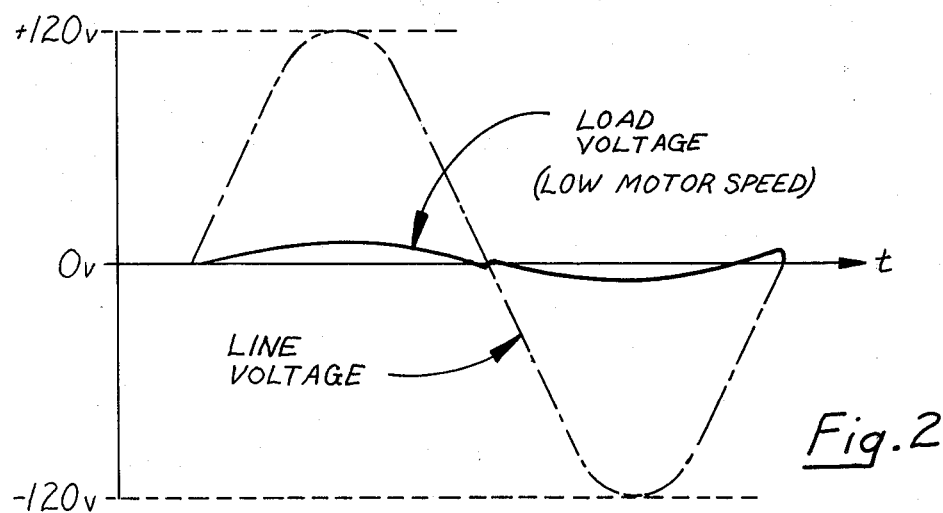
FIG. 2 is a waveform diagram illustrating applied motor voltage versus line voltage as a function of time for a slow motor speed condition.
Figure 3:
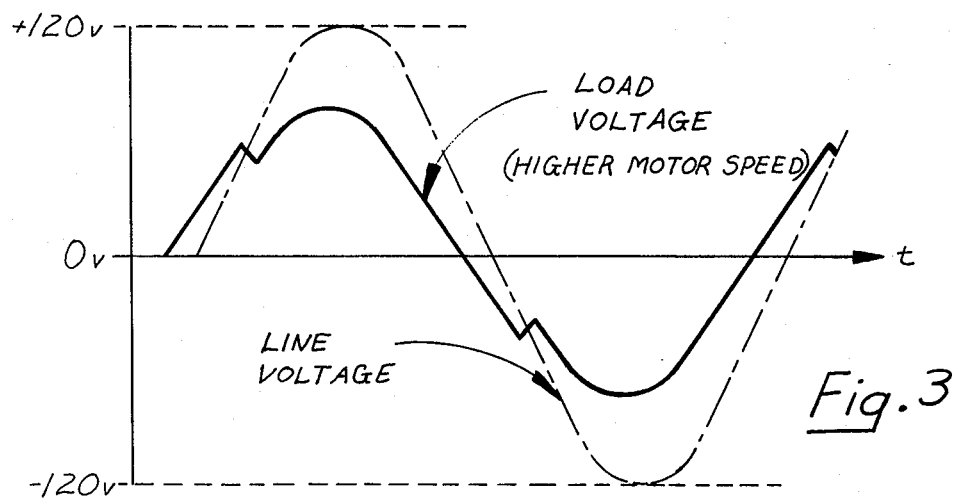
FIG. 3 is a waveform diagram illustrating applied motor voltage versus line voltage as a function of time for a higher motor speed condition.

A better understanding of the effect of the control circuit 10 on the amount of power applied to the motor 20 may be had by referring to FIGS. 2 and 3, which illustrate the load voltage, i.e., the amount of voltage applied to the motor at different conductive levels of the transistor pair 30,40. With particular reference to FIG. 2, the transistors, which are operating in a signal type mode, are in a very low level of conductivity wherein pole slippage on the motor is at a maximum, since the amount of voltage applied to the motor is minimal, while the amount of voltage dropped across the transistor pair is maximum. With reference to FIG. 3, as the conductivity level of the transistor pair 30,40 is increased, the amount of voltage dropped across the motor will increase, wherein the amount of pole slippage will also decrease, to increase the speed of the motor. FIG. 3 illustrates a medium speed condition, it being recognized that the full line voltage would be applied across the motor to provide maximum speed when the transistors 30,40 are driven in a saturation.

As may be seen from the waveforms illustrated in FIGS. 2 and 3, the load voltage, i.e., the amount of source voltage applied to the motor, is generally sinusoidal in character, with only minor switching transients. Further, it can be appreciated that the applied motor voltage is infinitely variable within a predetermined range, since the potentiometer 59 is of an infinitely variable type control. Thus, the control circuit 10 provides a very smooth motor speed control while maintaining the sinusoidal characteristics of the source voltage so as to preclude high current spikes and other switching transients that are undesirable, as discussed earlier. Further, since the transistors 30,40 share in carrying the motor current, they need only dissipate one-half of the transistor heat generated during low speed motor conditions when the transistors are dropping a large portion of the applied line voltage.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, this patent is not to be limited in scope and effect to the specific embodiment herein shown and described nor in any other way that is inconsistent with the extent to which the progress in the art has been advanced by the invention.

What is claimed is:

1. In combination with an alternating current power source and a multipole induction motor driving a generally constant load, a control circuit for varying the speed of the motor comprising:
 a pair of transistors connected in anti-parallel relationship with each other and being series-inserted between the source and the motor wherein alternating current pulses of like polarity flow through one or the other of the transistors to power the motor, the transistors functioning in push-pull manner wherein each transistor carries approximately one-half of the motor current;
 transistor biasing means adjustable by the motor user to set the conductivity of the transistors at a predetermined level to regulate the amount of power applied by the source to the motor via the transistors, the speed of the motor being determined by the degree of its pole slippage which is generally proportional to the applied power; and
 diode means in series with the transistors to preclude application of reverse current to the transistors.

2. A control circuit according to claim 1, wherein said transistors are NPN bipolar junction transistors.

3. A control circuit according to claim 2, wherein the collector of one transistor and the emitter of the other transistor are connected to each other via the diode means.

4. A control circuit according to claim 1, wherein the biasing means includes a single potentiometer adjustable by the motor user to vary the conduction levels of both transistors.

* * * * *